United States Patent
Sefton et al.

(10) Patent No.: US 11,516,204 B1
(45) Date of Patent: Nov. 29, 2022

(54) SYSTEM AND METHOD FOR SECURE SINGLE SIGN ON USING SECURITY ASSERTION MARKUP LANGUAGE

(71) Applicant: Express Scripts Strategic Development, Inc., St. Louis, MO (US)

(72) Inventors: Steven Sefton, Excelsior, MN (US); Neil J. Powell, St. Louis, MO (US); Travis Williams, Palm Harbor, FL (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 85 days.

(21) Appl. No.: 17/120,523

(22) Filed: Dec. 14, 2020

(51) Int. Cl.
| | |
|---|---|
| *H04L 29/06* | (2006.01) |
| *H04L 9/40* | (2022.01) |
| *H04L 41/22* | (2022.01) |
| *H04L 41/0869* | (2022.01) |

(52) U.S. Cl.
CPC ...... *H04L 63/0815* (2013.01); *H04L 41/0869* (2013.01); *H04L 41/22* (2013.01); *H04L 63/0807* (2013.01)

(58) Field of Classification Search
CPC . H04L 63/0815; H04L 41/0869; H04L 41/22; H04L 63/0807
USPC .......................................................... 726/8
See application file for complete search history.

(56) References Cited

U.S. PATENT DOCUMENTS

| | | | |
|---|---|---|---|
| 8,606,879 B2 | 12/2013 | Winkler | |
| 8,621,598 B2 | 12/2013 | Lai | |
| 9,401,847 B2 | 7/2016 | Yang | |
| 9,479,517 B2 | 10/2016 | Anand | |
| 9,716,622 B2 | 7/2017 | Mahadevan | |
| 10,237,363 B2 | 3/2019 | Stevens | |
| 10,542,117 B2 | 1/2020 | Gould | |
| 10,922,284 B1* | 2/2021 | Venkatasubramanian | ................... H04L 67/02 |
| 2012/0042042 A1 | 2/2012 | Winkler | |
| 2015/0058960 A1* | 2/2015 | Schmoyer | ............. G06F 21/335 726/8 |
| 2015/0235042 A1 | 8/2015 | Salehpour | |
| 2016/0134619 A1* | 5/2016 | Mikheev | ................. H04L 67/10 726/8 |
| 2016/0294797 A1* | 10/2016 | Martin | ................ H04L 63/0236 |
| 2017/0019410 A1* | 1/2017 | Reilly | ..................... G06F 21/31 |
| 2017/0317885 A1 | 11/2017 | Mahadevan | |
| 2018/0295134 A1* | 10/2018 | Gupta | .................. H04L 63/029 |
| 2018/0352421 A1 | 12/2018 | Chen | |
| 2020/0084202 A1* | 3/2020 | Smith | ..................... H04L 67/28 |
| 2020/0128290 A1 | 4/2020 | Deshpande | |

(Continued)

FOREIGN PATENT DOCUMENTS

| | | |
|---|---|---|
| EP | 2406931 B1 | 7/2013 |
| WO | 2012004185 A1 | 1/2012 |

*Primary Examiner* — Schquita D Goodwin
(74) *Attorney, Agent, or Firm* — Dickinson Wright PLLC

(57) ABSTRACT

A method for providing secure single sign on includes receiving a first data object from an application hosting server, the first data object indicating at least a service provider name and identifying a configuration file corresponding to the service provider name, wherein the configuration file includes at least trusted identity information. The method also includes determining, using the configuration file corresponding to the service provider name, whether the first data object is valid and, in response to a determination that the first data object is valid, generating a response message.

20 Claims, 7 Drawing Sheets

(56) References Cited

U.S. PATENT DOCUMENTS

| | | | |
|---|---|---|---|
| 2020/0213297 A1* | 7/2020 | Suraparaju | H04L 67/02 |
| 2020/0273558 A1 | 8/2020 | Yousfi | |
| 2021/0004704 A1* | 1/2021 | Dang | G06F 11/323 |
| 2021/0160231 A1* | 5/2021 | Kumar | H04L 63/083 |
| 2022/0131852 A1* | 4/2022 | Sharma | G06F 9/451 |

* cited by examiner

SYSTEM AND METHOD FOR SECURE SINGLE SIGN ON USING SECURITY ASSERTION MARKUP LANGUAGE

TECHNICAL FIELD

This disclosure relates to secure single sign on and in particular to systems and methods for secure single sign on using security assertion markup language protocols.

BACKGROUND

Use of web services accessed via the Internet has become ubiquitous for various important personal tasks. For example, may users utilize banking web services, insurance web services, health care web services, retail web services, and the like. Secure authentication of the user when accessing sensitive or confidential information on such web services is of paramount importance.

However, various difficulties arise when providing solutions for securely authenticating a user accessing one of the various web services. For example, the Internet is inherently insecure do to use of public infrastructure and shared resources. To guard against such inherently insecurities, various techniques may utilize various protocols, such as a secure assertion markup language protocol, or other suitable protocols.

SUMMARY

This disclosure relates generally to secure single sign on systems and methods.

An aspect of the disclosed embodiments includes a method for providing secure single sign on. The method includes receiving a first data object from an application hosting server, the first data object indicating at least a service provider name and identifying a configuration file corresponding to the service provider name, wherein the configuration file includes at least trusted identity information. The method also includes determining, using the configuration file corresponding to the service provider name, whether the first data object is valid and, in response to a determination that the first data object is valid, generating a response message.

Another aspect of the disclosed embodiments includes an apparatus for providing secure single sign on. The apparatus includes a processor and a memory. The memory includes instructions that, when executed by the processor, cause the processor to: receive a first data object from an application hosting server, the first data object indicating at least a service provider name; identify a configuration file corresponding to the service provider name, wherein the configuration file includes at least trusted identity information; determine, using the configuration file corresponding to the service provider name, whether the first data object is valid; and, in response to a determination that the first data object is valid, generate a response message.

Another aspect of the disclosed embodiments includes a system for providing secure single sign on. The system includes a processor and a memory. The memory includes instructions that, when executed by the processor, cause the processor to: receive a first data object from an application hosting server, the first data object indicating at least a service provider name; identify a configuration file corresponding to the service provider name, wherein the configuration file includes at least trusted identity information; determine, using the configuration file corresponding to the service provider name, whether the first data object is valid; in response to a determination that the first data object is valid, generate a response message; retrieve user information corresponding to a user indicated in the response message; in response to retrieving the user information corresponding to the user associated with the response message, create a session token; and configure, based on the session token, a user interface configured to, at least, receive input from the user.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
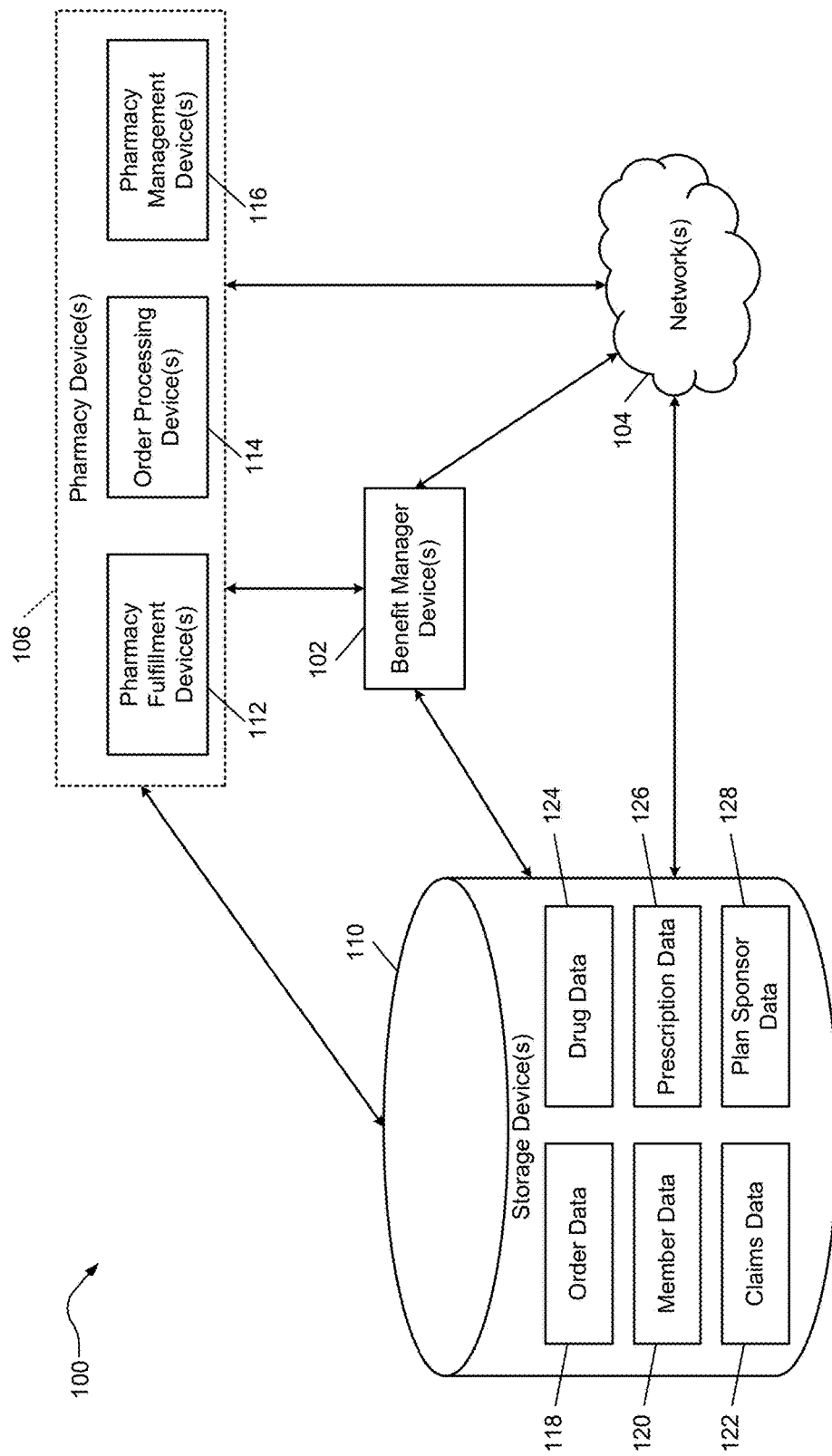
FIG. 1 generally illustrates a functional block diagram of a system including a high-volume pharmacy according to the principles of the present disclosure.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, use of web services accessed via the Internet has become ubiquitous for various important personal tasks. For example, may users utilize banking web services, insurance web services, health care web services, retail web services, and the like. Secure authentication of the user when accessing sensitive or confidential information on such web services is of paramount importance. For example, a user may interact with an interface, such as a web site (e.g., such as a uniform resource locator (URL)), a mobile phone application, and the like. The user may login to the interface using a set of credentials associated with the interface. The interface may be associated with an employer of the user, a membership of the user, or other suitable organization or enterprise associated with the user.

While engaging with the interface, the user may desire to access information associated with another organization requiring authentication of the user. For example, the user may access an employer URL and while engaging in the employer URL, access an interface for ordering or managing prescriptions associated with the user. The interface associated with ordering or managing prescriptions associated with the user may require authentication of the user. Accordingly, an access management mechanism may be used to authenticate the user using, for example, a security assertion markup language (SAML), such as SAML 2.0 or other suitable protocol or standard for providing authentication. SAML or SAML 2.0 include one or more standards for exchanging authentication and authorization between security domains. SAML or SAML 2.0 may include extensible markup language-based protocols that use security tokens that include assertions to communication information about a user (e.g., attempting a single sign on request) between at least identity provider and a service provider.

However, various difficulties arise when providing solutions for securely authenticating a user accessing one of the various web services. For example, the Internet is inherently insecure do to use of public infrastructure and shared resources. To guard against such inherently insecurities, various techniques may utilize various protocols, such as a secure assertion markup language protocol, or other suitable protocols.

Typically, techniques for providing secure single sign on include the use of an access management mechanism (e.g., a software application and the like) that is configured by an administrator of the access management mechanism, which may limit the ability of application developers or users of such access management mechanisms from making further configurations that may suit the needs of the application developers or users. Additionally, or alternatively, it may be difficult to find access management mechanism expects, developers may have to design solutions that accommodate (e.g., or work around) features of the access management mechanism for which they develop has little or no configuration control, it may be difficult to addition new features to the access management mechanism, typical access management administrators may not be familiar with the nuances of an application using the access management mechanism, and so on.

Accordingly, systems and methods, such as those described herein, configured to provide secure validation and assertion creation, without relying on such access management mechanisms, may be desirable. In some embodiments, the systems and methods described herein may use a representational state transfer (REST) application programming interface (API), such as a SAML 2.0 REST API. The systems and methods described herein may be configured to provide configuration control to application developers for implementing secure single sign on algorithms (e.g., including single sign on inbound to applications and outbound from applications) and/or other suitable algorithms.

In some embodiments, the systems and methods described herein may be configured to provide an inbound single sign on REST API endpoint that validates SAML responses and returns a decrypted SAML assertion. The systems and methods described herein may be configured to provide the SAML assertion to a suitable application according to requirements and/or configuration parameters provided by an application developer of the suitable application.

In some embodiments, the systems and methods described herein may be configured to provide an outbound single sign on REST API endpoint that generates or creates SAML responses based on received input parameters. The systems and methods described herein may be configured to define SAML identity providers and/or service providers within an application (e.g., or suit of applications or system) according to requirements and/or configuration parameters provided the corresponding application developer. The systems and methods described herein may be configured to define trust relationships between identity providers and service providers. The systems and methods described herein may be configured to provide application developers with development capabilities for securely meeting development requirements without having to use access management mechanisms that may otherwise restrict application developer development access.

In some embodiments, the systems and methods described herein may be configured to receive a first data object from an application hosting server. The first data object may indicate at least a service provider name. The systems and methods described herein may be configured to identify a configuration file corresponding to the service provider name. The configuration file may include at least trusted identity information.

In some embodiments, the systems and methods described herein may be configured to determine, using the configuration file corresponding to the service provider name, whether the first data object is valid. The systems and methods described herein may be configured to, in response to a determination that the first data object is valid, generate a response message. In some embodiments, the response message may include at least security assertion markup language assertion information.

In some embodiments, the systems and methods described herein may be configured to retrieve user information corresponding to a user associated with the security assertion markup language assertion information. The systems and methods described herein may be configured to, in response to retrieving the user information corresponding to the user associated with the security assertion markup language assertion information, create a session token.

In some embodiments, the systems and methods described herein may be configured to configure (e.g., set a cookie or other suitable configuration parameter), based on the response message and/or the session token, a user interface (e.g., a URL or other suitable interface), at least, receive input from a user. The systems and methods described herein may be configured to receive, from the user interface, a data request. The systems and methods described herein may be configured to generate, in response to the data request, at least one user interface output characteristic (e.g., such as a characteristic associated with a landing page or the suitable URL or interface) The systems and methods described herein may be configured to provide, at the user interface, the at least one user interface output characteristic.

As described, the systems and methods described herein may be configured to provide an single sign on REST API endpoint that validates SAML responses and returns a decrypted SAML assertion. For example, a user may access a first URL (e.g., such as an employer URL or other suitable URL) by using user login credentials associated with the first URL. The user may then access, through the first URL, a second URL. The second URL may be associated with an entity that is different from an entity associated with the first URL. For example, the entity associated with the second URL may include a pharmacy, an insurance provider, a financial institution, or other suitable entity. The second URL may require authentication of the user prior to the user gaining access to confidential information associated with the second URL. The systems and methods described herein may be configure to provide an inbound and/or an outbound secure single sign on REST API, such that the user may login to the first URL using the credentials for the first URL and be granted access to the second URL through the first URL based on an authentication of the user using the REST API. It should be understood that the first URL and/or the second URL may be associated with any suitable entity. Additionally, or alternatively, while a pharmacy, as will be described, is provided herein, the principles of the present disclosure apply to any suitable entity or application.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104. The system 100 may also include a storage device 110.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in the storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Va.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfilment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. In some embodiments, the memory may include instructions that cause the processor of the order processing device 114 to, at least, perform the processes or methods described herein. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the use of the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
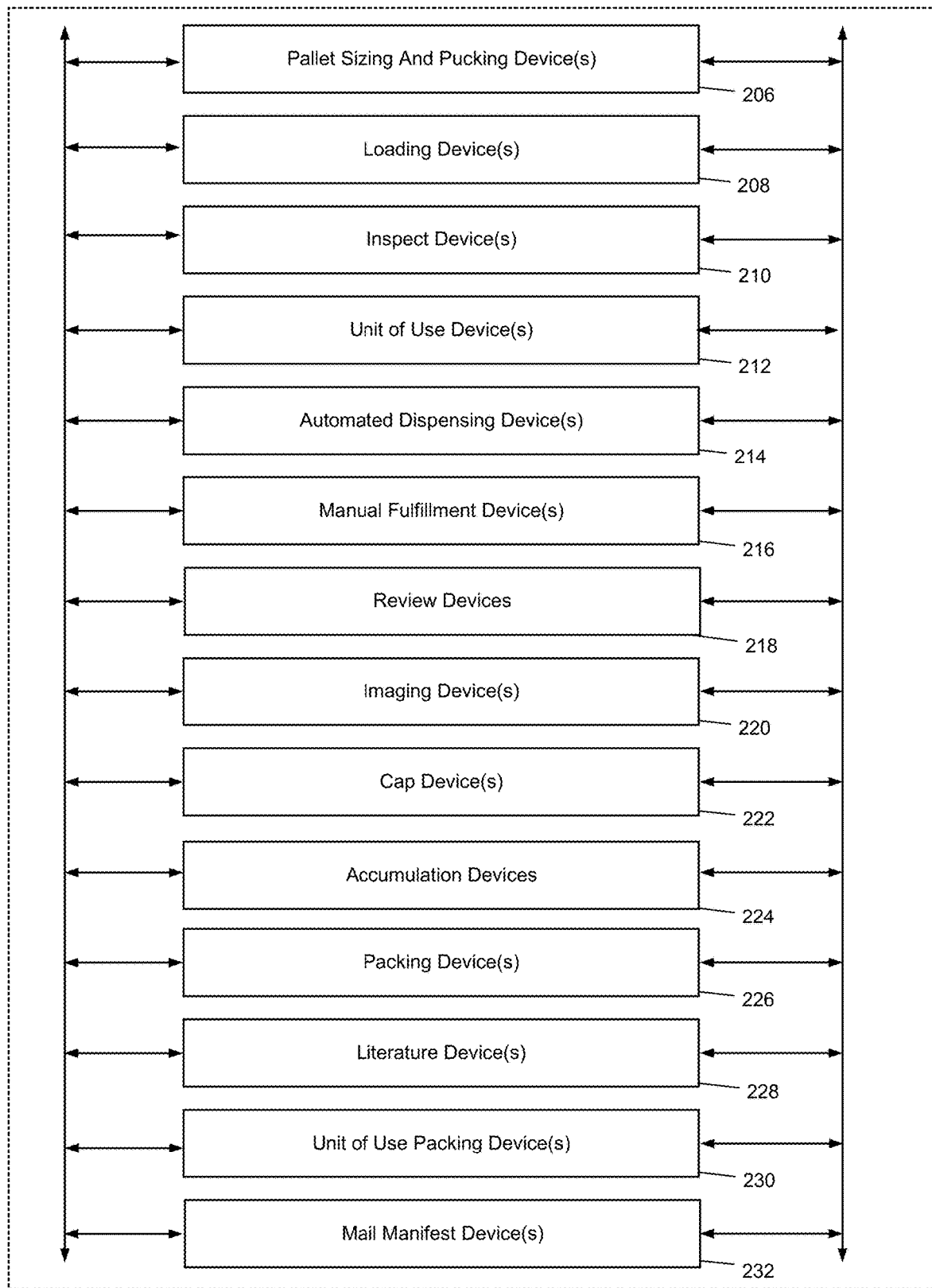
FIG. 2 generally illustrates a functional block diagram of a pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
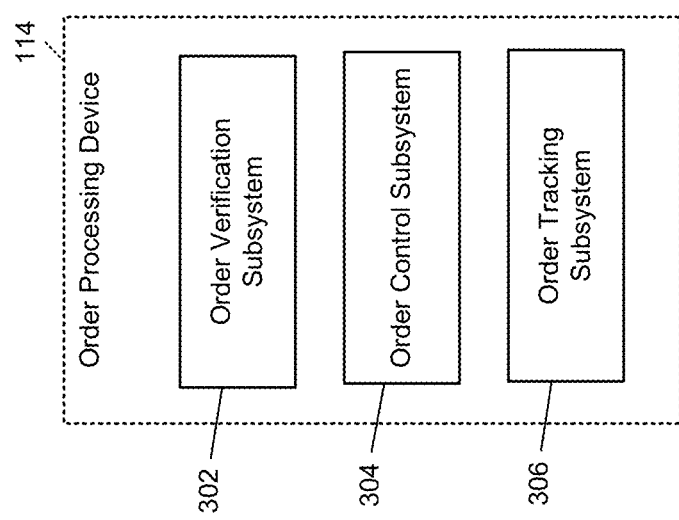
FIG. 3 generally illustrates a functional block diagram of an order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

In some embodiments, the order processing device 114 may be configured to perform an inbound and/or an outbound single sign on using a REST API. It should be understood that the order processing device 114 described herein is provided for exemplary purposes only and that the systems and methods described herein may be performed using other suitable computing devices. Additionally, or alternatively, the principles of the present disclosure may be applied to any suitable application in addition to or instead of those described herein.

Figure 4:
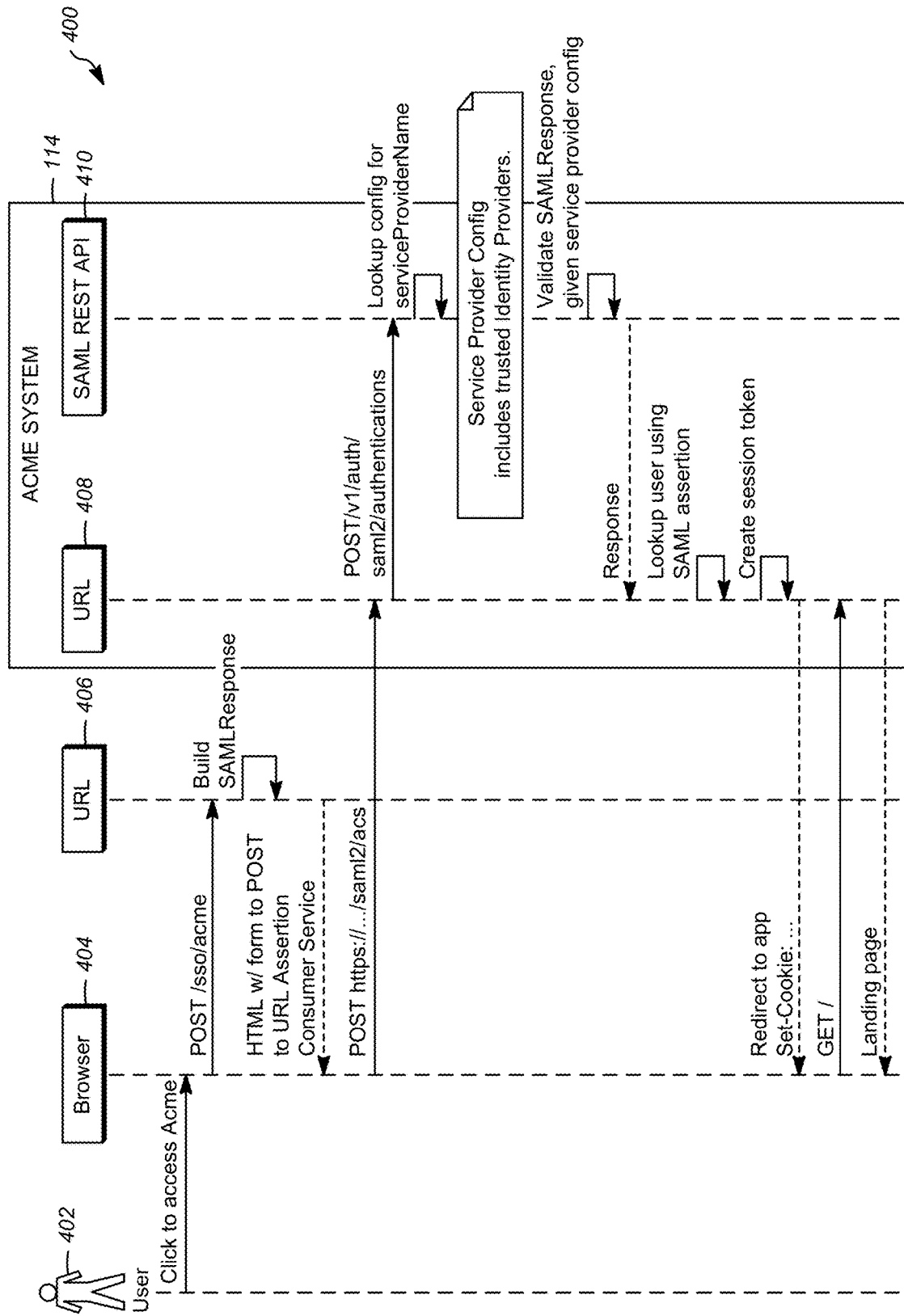
FIG. 4 generally illustrates an inbound single sign on system according to the principles of the present disclosure.

FIG. 4 generally illustrates an inbound single sign on system 400 according to the principles of the present disclosure. As described, a user, such as a user 402, may access a first URL (e.g., or other suitable access point) 406 using an interface 404. The first URL 406 may be referred to as a partner site. However, it should be understood that the first URL 406 may include any suitable access point to any suitable location. For example, the first URL 406 may correspond to an employer site of an employer or the user 402, a membership site associated with the user 402, or any other suitable site or access point. The interface 404 may include any suitable interface, such as a browser or other interface configured to allow the user 402 to access and interact or engage with the first URL 406.

The user 402 may access the first URL 406, using the interface 404, by providing a first set of credentials. The first set of credentials may include a user name and a password associated with the user 402 and corresponding to an authentication of the user 402 on the first URL 406. When the user accesses the first URL 406, using the interface 404, by providing the first set of credentials, the user 402 may be granted access to information associated with the first URL 406. While the user 402 interacts or engages with the first URL 406, the user 402 may select, using the interface 404, information or an option that redirects the user 402 to a second URL 408. For example, the user 402 may select an option to access pharmacy information. The second URL 408 may include a URL or site associated with the system 100 (e.g., and the high volume pharmacy, as described).

The second URL 408 may be generated and/or provided by the order processing device 114 or other suitable computing device. The order processing device 114 may include an application hosting server and/or an application hosting service executed by the order processing device 114. It should be understood that, while a pharmacy and the order processing device 114 are described, the principles of the present disclosure are applicable to any suitable application in addition to or instead of those described herein.

In some embodiments, in response to the user 402 attempting to access the second URL 408, the interface 404 may generate a single sign on request message. The single sign on request message may include any suitable message and may follow and suitable protocol. For example, the single sign on request message may include a hypertext transfer protocol (HTTP) POST binding form. The HTTP POST binding form may information associated with a single sign on request to the second URL 408 or other suitable information.

The interface 404 may communicate or transmit the single sign on request message to the first URL 406. The first URL 406 may generate a response message to the single sign on request message. The response message may include any suitable message and/or follow any suitable protocol. For example, the response message may include a SAML response or other suitable response message. The response message may include a form (e.g., a hypertext markup language (HTML) form or other suitable form) including information to POST to an assertion for a customer service associated with the second URL 408. The response message may include a request for information associated with the single sign on request, such as a name or the user 402 and/or other suitable information.

The first URL 406 may communicate or transmit the response message to the interface 404. The interface 404 may provide the information (e.g., using a POST binding message or other suitable message and/or protocol), in response to the response message, to the second URL 408. For example, the interface 404 may provide, to the order processing device 114, an authentication response (e.g., providing the information using the POST binding message or other suitable message and/or protocol) including an assertion (e.g., a SAML assertion) indicating, at least, a service provider name associated with the first URL 406. The service provider name may correspond to a service provider associated with the second URL 408 (e.g., the system 100 or the high volume pharmacy or other suitable service provider).

The order processing device 114 may include an API, such as a SAML REST API 410, as described. The REST API 410 may receive the authentication response from the second URL 408. The REST API 410 may include software, code, or instructions disposed on a memory of the order processing device 114. The processor associated with the order processing device 114 may execute the, software, code, or instructions on the memory to perform the functions and/or features of the REST API 410.

In some embodiments, the REST API 410 may provide support for single sign on into a partner application as a SAML identity provider (e.g., the system 100 or high volume pharmacy and/or any other suitable partner application). The REST API 410, as will be described, may be configured to provide response creation. The REST API 410 endpoint may accept a request including SAML assertion content, such as service provider name, attributes, and/or other information. Additionally, or alternatively, the request may include information corresponding to a SAML identity provider and service provider that are registered on an authenticator platform. The REST API 410 may be configured to validate that the specified identity provider and the service provider are register on the authenticator platform and include a valid integration definition (e.g., a configuration file).

The REST API 410 may identify the service provider name using the authentication response from the interface 404. The REST API 410 may look up or identify a configuration file associated with the service provider name. For example, the REST API 410 may access data store, such as a table, database, memory, or other data store or data storage mechanism. The data store may include information correlating a configuration file to one or more service provider names. For example, a first service provider name may be associated with a first configuration file. The data store may include information correlating the first service provider name with the first configuration file.

In some embodiments, the application developer responsible for configuring the second URL 408 may generate one or more configuration files associated with the second URL 408. The application developer may store the configuration files in the data store. Additionally, or alternatively, the configuration files may be generated by an application management mechanism and/or may include pre-configured configuration files associated with the application management mechanism.

In some embodiments, the configuration file associated with the service provider name indicated in the authentication response indicates one or more authorized identity provider names. An identity provider may include an entity (e.g., or system) that generates and/or maintains identity information for users, such as the user 402 or other suitable user. The identity providers may provide may provide authentication services, such as authentication services for use in single sign on requests. In some embodiment, the configuration file may include one or more integration definitions. The integration definitions may indicate whether the sign an assertion associated with the authentication response, whether to encrypt the assertion associated with the authentication response, a validity period of the assertion associated with the authentication response, other information, or a combination thereof.

In some embodiments, the REST API 410 may be configured to validate the authentication response based on the configuration file. For example, the REST API 410 may determine whether the configuration file for the service provider name identified in the authentication response includes the identity provider name associated with the first URL 406. If the REST API 410 determines that the configuration file for the service provider name identified in the authentication response includes the identity provider name associated with the first URL 406, the REST API 410 validates the authentication response. Alternatively, if the REST API 410 determines that the configuration file for the service provider name identified in the authentication response does not include the identity provider name associated with the first URL 406, the REST API 410 determines the authentication response is invalid. The REST API 410 may generate a message indicating that the authentication response is not valid and that the user 402 is not authorized to access the second URL 408. The REST API 410 may communicate the message to the interface 404.

If the REST API 410 determines that the authentication response is valid, the REST API 410 may generate an success response message. The success response message may include any suitable message and/or may follow any suitable protocol (e.g., such as a SAML assertion or a SAML response message). The success response message may include an assertion, such as a SAML assertion, indicating the user 402, the service provider, the identity provider, other information, or a combination thereof. The REST API 410 may generate the success response message (e.g., and the assertion) according to the configuration file. For example, the configuration file may indicate to encrypt the assertion associated with the success response message. The REST API 410 may encrypt the assertion. It should be understood that the configuration file may indicate any suitable instructions for the REST API 410 to generate the success response message. In some embodiments, the assertion may include a JavaScript object notation (JSON) object containing a base64-encoded, decrypted SAML assertion that was embedded within the authentication response message.

In some embodiments, the REST API 410 may communicate or transmit the success response message to the second URL 408. The second URL 408 may look up or identify the user 402 using the success response message (e.g., which may include a decrypted SAML assertion). For example, the second URL 408 may identify the user 402 in a data store, such as a table, database, memory, or other suitable data store or data storage mechanism. In response to identifying the user 402, the second URL 408 may generate or create a session token. The session token may include any suitable token comprising any suitable information. For example, the session token may indicate that the user 402 is authorized to access the second URL 408.

The second URL 408 may communicate the session token to the interface 404. The second URL 408, using the session token, may set at least one characteristic or attribute of the interface 404. For example, the second URL 408 may set a cookie or other characteristic or attribute of the interface 404. The interface 404 may generate a get message requesting the second URL 408 provide information to the interface 404. For example, the get message may request the second URL 408 provide one or more interface characteristics, such as one or more characteristics of a landing page or other suitable characteristics, to the interface 404.

The second URL 408 may communicate the one or more interface characteristics to the interface 404. For example, the second URL 408 may communicate characteristics of a landing page associated with the second URL 408. The interface 404 may display the one or more interface characteristics provided by the second URL 408. The user 402 may interact with the second URL 408 using the one or more interface characteristics displayed by the interface 404.

Figure 5:
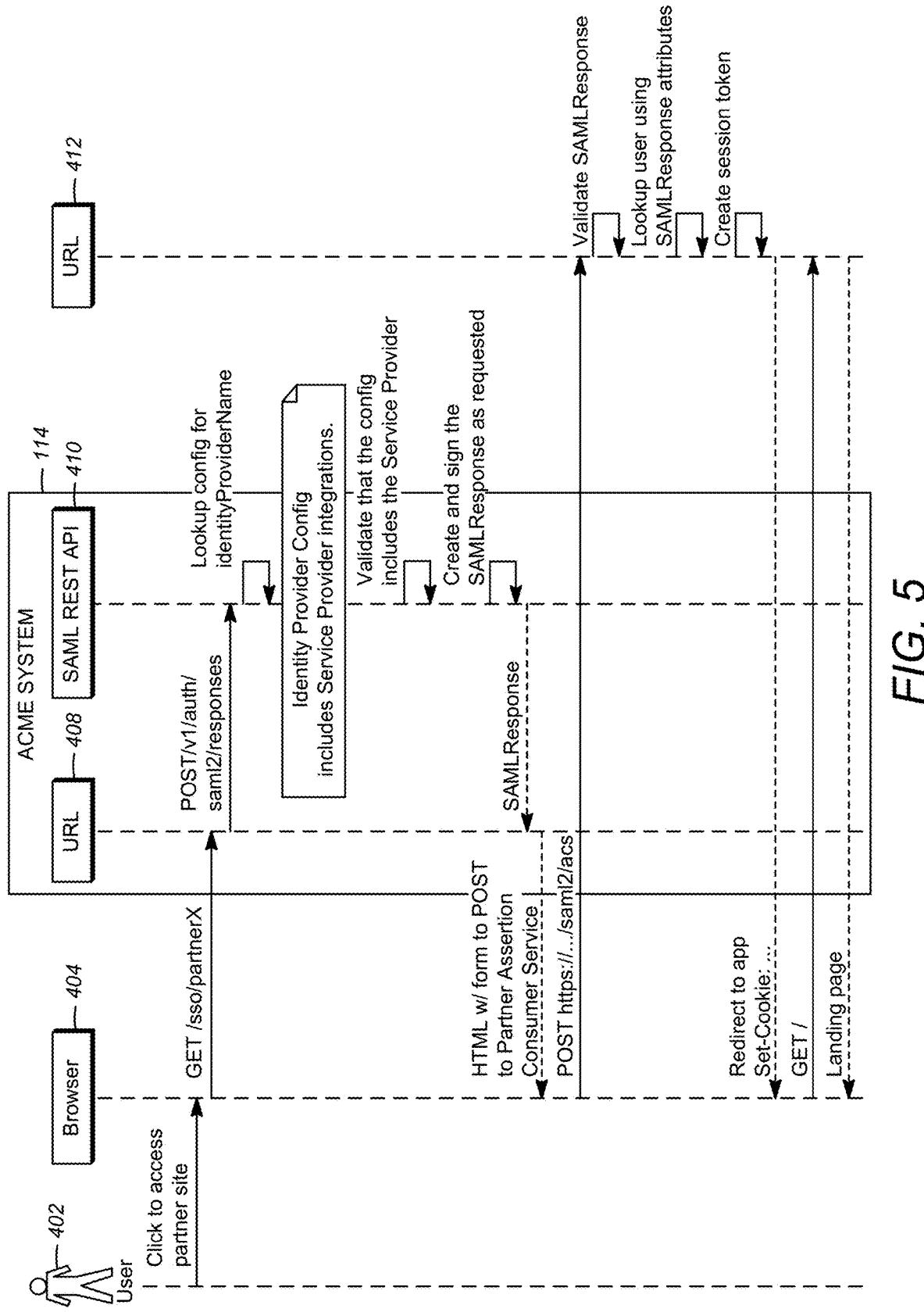
FIG. 5 generally illustrates an outbound single sign on system according to the principles of the present disclosure.
Figure 6:
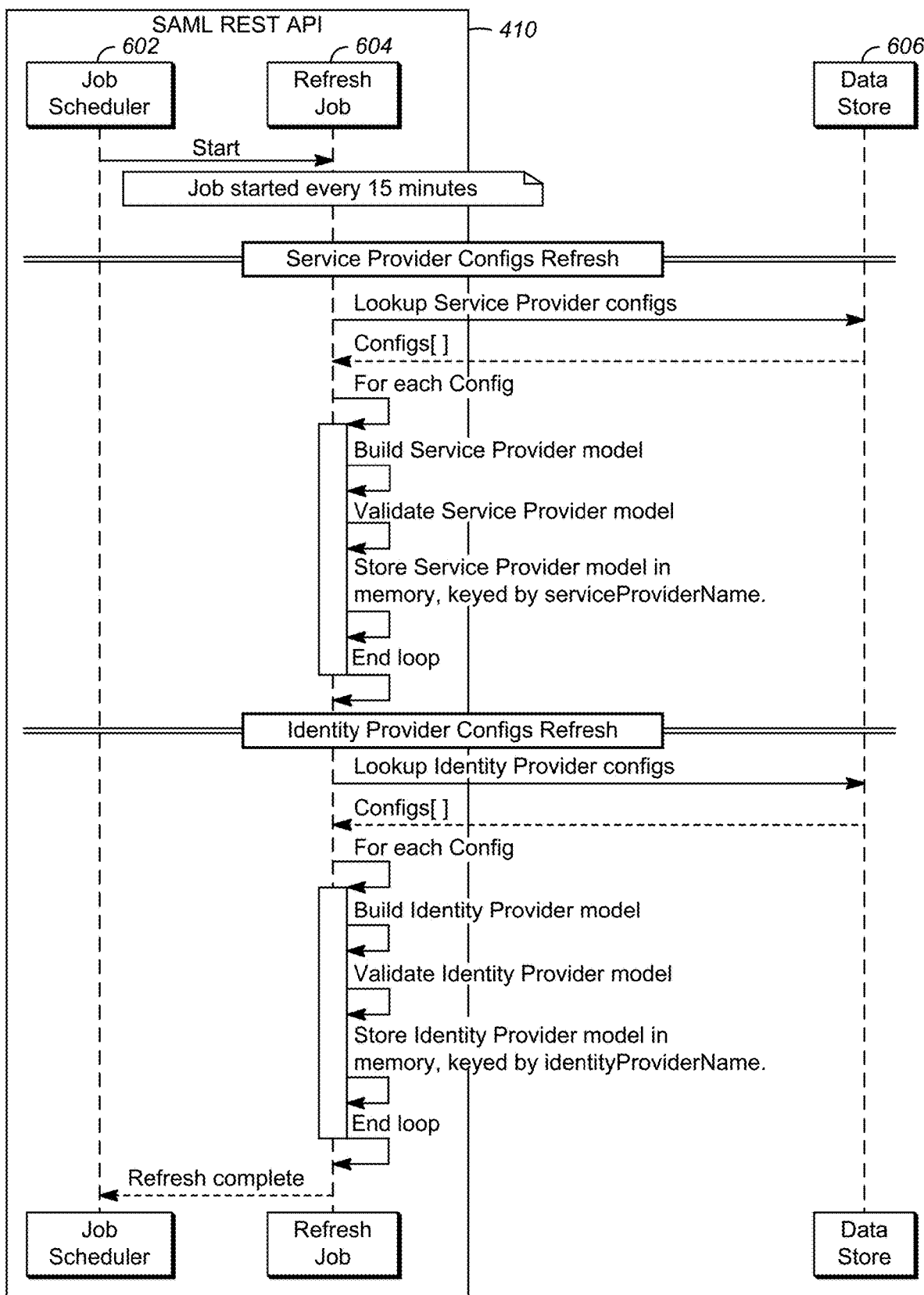
FIG. 6 generally illustrates a refresh system according to the principles of the present disclosure.

In some embodiments, the order processing device 114 may generate an outbound single sign on request, as is generally illustrated in FIG. 5. For example, the user 402 may use the interface 404 to access the second URL 408. While the user 402 interact or engages with the second URL 408, the user 402 may select information or an option associated with a third URL 412 (e.g., which may be referred to as a partner site) or other suitable location. The interface 404 may generate a get request indicating a request to access the third URL 412. The second URL 408 may generate request message, as described, including an assertion indicating the user name of the user 402, the identity provider name of the second URL 408, other information, or a combination thereof. The second URL 408 may communicate or transmit the request message to the REST API 410.

The REST API 410 may look up or identify a configuration file corresponding to the identity provider name indicated in the request message. As described, the REST API 410 may access a data store that correlates configuration files with identity provider names. The REST API 410 may identify trusted service providers associated with the identity provider name using the configuration file.

The REST API 410 may determine whether the request message is valid. For example, the REST API 410 may determine that the request message is valid if the service provider name associated with the third URL 412 is included in the configuration file associated with the identity provider name indicated by the request message. If the REST API 410 determines that the request message is not valid, the REST API 410 may generate a response message indicating that the user 402 is not authorized to access the third URL 412.

Alternatively, if the REST API 410 determines that the request message is valid, the REST API 410 may generate and sign an authentication response message that includes an assertion indicating that the user 402 is authorized to access the third URL 412. The REST API 410 may generate the success response message (e.g., and the assertion) according to the configuration file. For example, the configuration file may indicate to encrypt the assertion associated with the authentication response message. The REST API 410 may encrypt the assertion. It should be understood that the configuration file may indicate any suitable instructions for the REST API 410 to generate the success response message. In some embodiments, the assertion may include a JavaScript object notation (JSON) object containing a base64-encoded, SAML response that was embedded within the request message.

The REST API 410 may communicate or transmit the response message to the second URL 408. The second URL 408 may generate a response message to the single sign on request message. The response message may include any suitable message and/or follow any suitable protocol. For example, the response message may include a SAML response or other suitable response message. The response message may include a form (e.g., an HTML form or other suitable form) including information to POST to an assertion for a customer service associated with the third URL 412. The response message may include a request for information associated with the single sign on request, such as a name or the user 402 and/or other suitable information.

The second URL 408 may communicate or transmit the response message to the interface 404. The interface 404 may provide the information (e.g., using a POST binding message or other suitable message and/or protocol), in response to the response message, to the third URL 412. For example, the interface 404 may provide, to the third URL 412, an authentication response (e.g., providing the information using the POST binding message or other suitable message and/or protocol) including an assertion (e.g., a SAML assertion) indicating, at least, the user name of the user 402 and/or any other suitable information for requesting single sign on to the third URL 412.

The third URL 412 may be configured to validate the authorization request using any suitable technique. The third URL 412 may generate a session token, as described. The third URL 412 may communicate the session token to the interface 404. The third URL 412, using the session token, may set at least one characteristic or attribute of the interface 404. For example, the third URL 412 may set a cookie or other characteristic or attribute of the interface 404. The interface 404 may generate a get message requesting the third URL 412 provide information to the interface 404. For example, the get message may request the third URL 412 provide one or more interface characteristics, such as one or more characteristics of a landing page or other suitable characteristics, to the interface 404.

The third URL 412 may communicate the one or more interface characteristics to the interface 404. For example, the third URL 412 may communicate characteristics of a landing page associated with the third URL 412. The interface 404 may display the one or more interface characteristics provided by the third URL 412. The user 402 may interact with the third URL 412 using the one or more interface characteristics displayed by the interface 404.

In some embodiments, the REST API 410 may be configured to refresh configuration files associated with service providers and configuration files associated with identity providers. For example, the REST API 410 may include a job scheduler 602. The job scheduler 602 may be configured to schedule one or more jobs such as a refresh job or other suitable job. The job scheduler 602 my start a refresh job 604. In some embodiments, the job scheduler 602 may start the refresh job 604 periodically, such as every fifteen minutes or other suitable period.

The refresh job 604 may be configured to retrieve, from a data store, such as the data store 606, configuration files associated with service providers. The data store 606 may include features similar to, other than, or in addition to any of the data stores described herein. The refresh job 604 may be configured to, for each configuration file associated with each respective service provider, build a service provider model, validate each service provider model, store each service provider model in an associated memory using respective service provider names as identifiers, perform other suitable functions, or a combination thereof.

The refresh job 604 may be configured to retrieve, from the data store 606, configuration files associated with identity providers. The refresh job 604 may be configured to, for each configuration file associated with each respective identity provider, build an identity provider model, validate each identity provider model, store each identity provider model in an associated memory using respective identity provider names as identifiers, perform other suitable functions, or a combination thereof.

Figure 7:
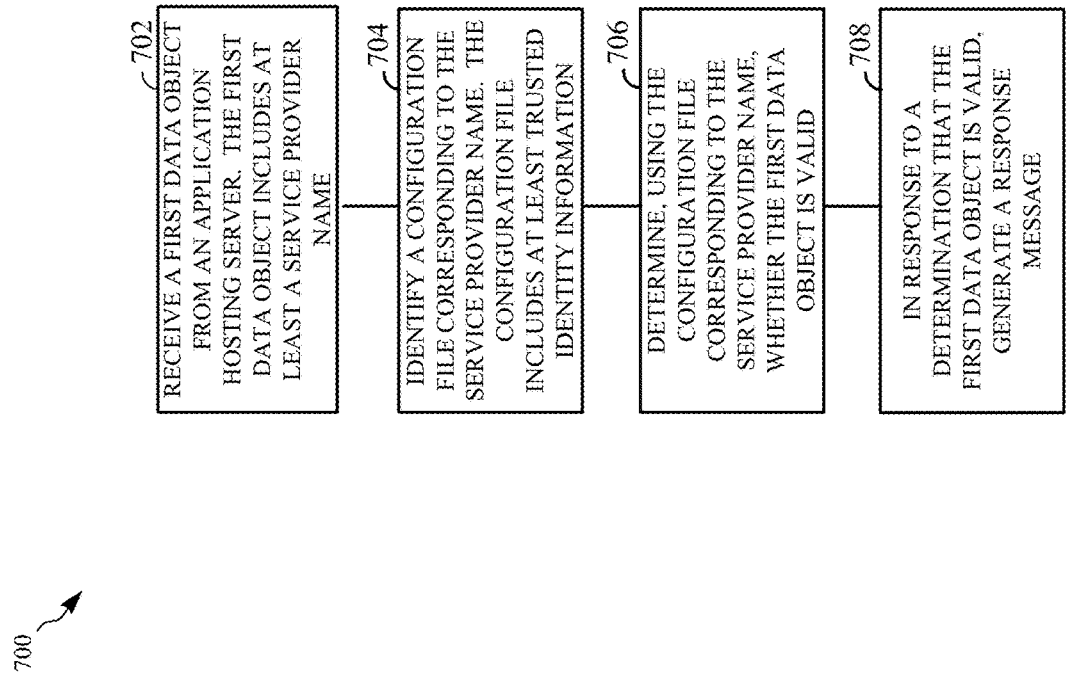
FIG. 7 is a flow diagram generally illustrating a single sign on method according to the principles of the present disclosure.

FIG. 7 is a flow diagram generally illustrating a single sign on method 700 according to the principles of the present disclosure. At 702, the method 700 receives a first data object from an application hosting server, the first data object indicating at least a service provider name. For example, the REST API 410 may receive a first data object from the second URL 408. The first data object may include the authentication response message. The first data object may indicate the service provider name, as described.

At 704, the method 700 identifies a configuration file corresponding to the service provider name, the configuration file including at least trusted identity information. For example, the REST API 410 may retrieve the configuration file corresponding to the service provider name from the data store. The configuration file may include at least trusted identity information. The trusted identity information may include one or more trusted identity provider names, as described.

At 706, the method 700 determines, using the configuration file corresponding to the service provider name, whether the first data object is valid. For example, the REST API 410 determines, using the configuration file, whether the first data object is valid, as described.

At 708, the method 700, in response to a determination that the first data object is valid, generates a response message. For example, the REST API 410, in response to determining that the first data object is valid, generates a response message. The response message may include the success response message, as described.

In some embodiments, a method for providing secure single sign on includes receiving a first data object from an application hosting server, the first data object indicating at least a service provider name and identifying a configuration file corresponding to the service provider name, wherein the configuration file includes at least trusted identity information. The method also includes determining, using the configuration file corresponding to the service provider name, whether the first data object is valid and, in response to a determination that the first data object is valid, generating a response message.

In some embodiments, the response message includes at least security assertion markup language assertion information. In some embodiments, the method also includes retrieving user information corresponding to a user associated with the security assertion markup language assertion information. In some embodiments, the method also includes, in response to retrieving the user information corresponding to the user associated with the security assertion markup language assertion information, creating a session token. In some embodiments, the method also includes configuring, based on the response message, a user interface configured to, at least, receive input from a user. In some embodiments, the method also includes receiving, from the user interface, a data request. In some embodiments, the method also includes generating, in response to the data request, at least one user interface output characteristic. In some embodiments, the method also includes providing, at the user interface, the at least one user interface output characteristic.

In some embodiments, an apparatus for providing secure single sign on includes a processor and a memory. The memory includes instructions that, when executed by the processor, cause the processor to: receive a first data object from an application hosting server, the first data object indicating at least a service provider name; identify a configuration file corresponding to the service provider name, wherein the configuration file includes at least trusted identity information; determine, using the configuration file corresponding to the service provider name, whether the first data object is valid; and, in response to a determination that the first data object is valid, generate a response message.

In some embodiments, the response message includes at least security assertion markup language assertion information. In some embodiments, the instructions further cause the processor to retrieve user information corresponding to a user associated with the security assertion markup language assertion information. In some embodiments, the instructions further cause the processor to, in response to retrieving the user information corresponding to the user associated with the security assertion markup language assertion information, create a session token. In some embodiments, the instructions further cause the processor to configure, based on the response message, a user interface configured to, at least, receive input from a user. In some embodiments, the instructions further cause the processor to receive, from the user interface, a data request. In some embodiments, the instructions further cause the processor to generate, in response to the data request, at least one user interface output characteristic. In some embodiments, the instructions further cause the processor to provide, at the user interface, the at least one user interface output characteristic.

In some embodiments, a system for providing secure single sign on includes a processor and a memory. The memory includes instructions that, when executed by the processor, cause the processor to: receive a first data object from an application hosting server, the first data object indicating at least a service provider name; identify a configuration file corresponding to the service provider name, wherein the configuration file includes at least trusted identity information; determine, using the configuration file corresponding to the service provider name, whether the first data object is valid; in response to a determination that the first data object is valid, generate a response message; retrieve user information corresponding to a user indicated in the response message; in response to retrieving the user information corresponding to the user associated with the response message, create a session token; and configure, based on the session token, a user interface configured to, at least, receive input from the user.

In some embodiments, the instructions further cause the processor to receive, from the user interface, a data request. In some embodiments, the instructions further cause the processor to generate, in response to the data request, at least one user interface output characteristic. In some embodiments, the instructions further cause the processor to provide, at the user interface, the at least one user interface output characteristic.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

Implementations of the systems, algorithms, methods, instructions, etc., described herein may be realized in hardware, software, or any combination thereof. The hardware may include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

What is claimed is:

1. A method for providing secure single sign on, the method comprising:
   receiving a binding message, including a first data object, from an application hosting server, the first data object indicating at least a service provider name;
   identifying, using a representational state transfer application programming interface, a configuration file corresponding to the service provider name, wherein the configuration file includes at least trusted identity information;
   determining, using the configuration file corresponding to the service provider name, whether the first data object is valid; and
   in response to a determination that the first data object is valid, generating a response message.

2. The method of claim 1, wherein the response message includes at least security assertion markup language assertion information.

3. The method of claim 2, further comprising retrieving user information corresponding to a user associated with the security assertion markup language assertion information.

4. The method of claim 3, further comprising, in response to retrieving the user information corresponding to the user associated with the security assertion markup language assertion information, creating a session token.

5. The method of claim 1, further comprising configuring, based on the response message, a user interface configured to, at least, receive input from a user.

6. The method of claim 5, further comprising receiving, from the user interface, a data request.

7. The method of claim 6, further comprising generating, in response to the data request, at least one user interface output characteristic.

8. The method of claim 7, further comprising providing, at the user interface, the at least one user interface output characteristic.

9. An apparatus for providing secure single sign on, the apparatus comprising:
- a processor; and
- a memory that includes instructions that, when executed by the processor, cause the processor to:
  - receive a binding message, including a first data object, from an application hosting server, the first data object indicating at least a service provider name;
  - identify, using a representational state transfer application programming interface, a configuration file corresponding to the service provider name, wherein the configuration file includes at least trusted identity information;
  - determine, using the configuration file corresponding to the service provider name, whether the first data object is valid; and
  - in response to a determination that the first data object is valid, generate a response message.

10. The apparatus of claim 9, wherein the response message includes at least security assertion markup language assertion information.

11. The apparatus of claim 10, wherein the instructions further cause the processor to retrieve user information corresponding to a user associated with the security assertion markup language assertion information.

12. The apparatus of claim 11, wherein the instructions further cause the processor to, in response to retrieving the user information corresponding to the user associated with the security assertion markup language assertion information, create a session token.

13. The apparatus of claim 9, wherein the instructions further cause the processor to configure, based on the response message, a user interface configured to, at least, receive input from a user.

14. The apparatus of claim 13, wherein the instructions further cause the processor to receive, from the user interface, a data request.

15. The apparatus of claim 14, wherein the instructions further cause the processor to generate, in response to the data request, at least one user interface output characteristic.

16. The apparatus of claim 15, wherein the instructions further cause the processor to provide, at the user interface, the at least one user interface output characteristic.

17. A system for providing secure single sign on, the system comprising:
- a processor; and
- a memory that includes instructions that, when executed by the processor, cause the processor to:
  - receive a binding message, including a first data object, from an application hosting server, the first data object indicating at least a service provider name;
  - identify, using a representational state transfer application programming interface, a configuration file corresponding to the service provider name, wherein the configuration file includes at least trusted identity information;
  - determine, using the configuration file corresponding to the service provider name, whether the first data object is valid;
  - in response to a determination that the first data object is valid, generate a response message;
  - retrieve user information corresponding to a user indicated in the response message;
  - in response to retrieving the user information corresponding to the user associated with the response message, create a session token; and
  - configure, based on the session token, a user interface configured to, at least, receive input from the user.

18. The system of claim 17, wherein the instructions further cause the processor to receive, from the user interface, a data request.

19. The system of claim 18, wherein the instructions further cause the processor to generate, in response to the data request, at least one user interface output characteristic.

20. The system of claim 19, wherein the instructions further cause the processor to provide, at the user interface, the at least one user interface output characteristic.

\* \* \* \* \*